Figure 10:
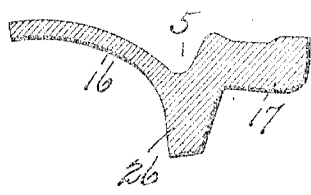

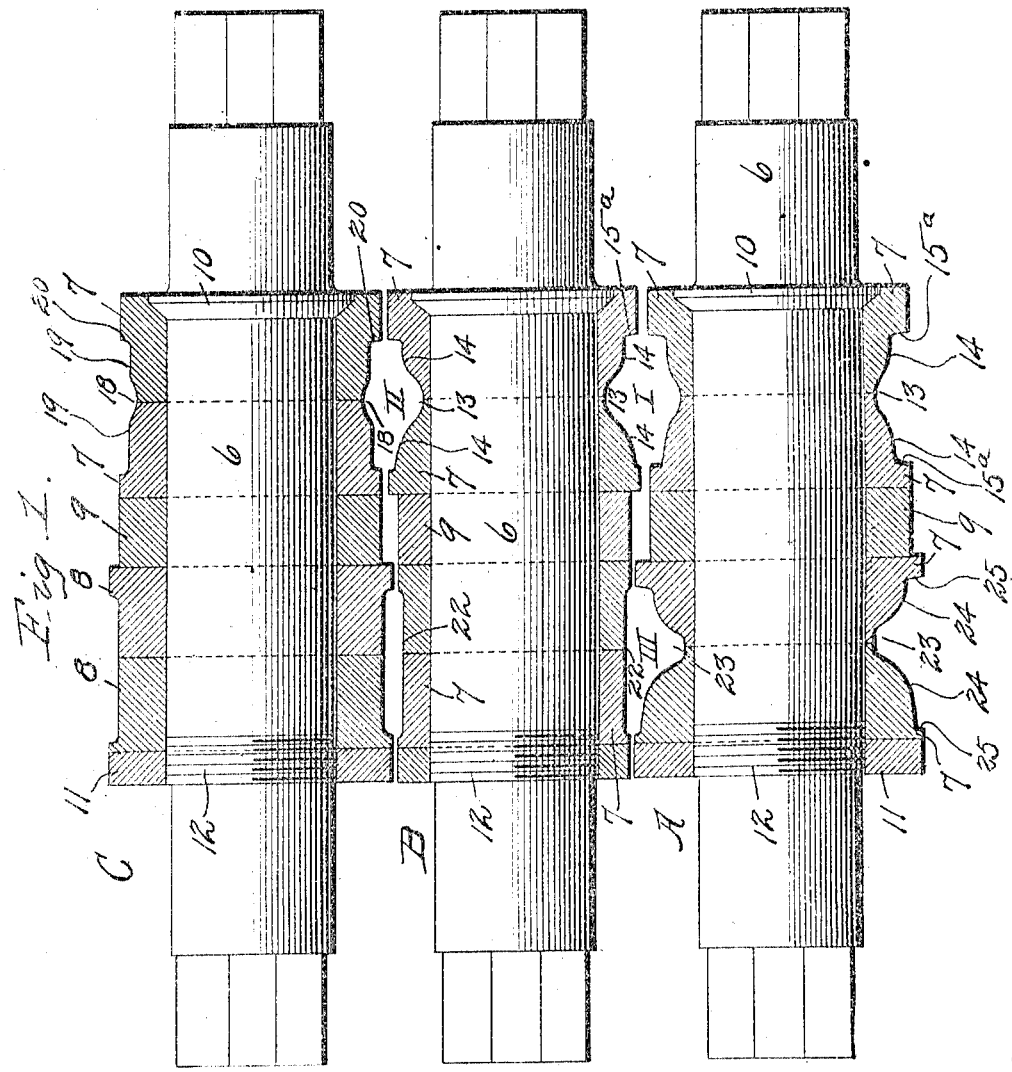

W. J. BRADLEY.
PROCESS OF SHAPING RAIL JOINT BARS.
APPLICATION FILED SEPT. 24, 1908.
1,040,614.
Patented Oct. 8, 1912.
5 SHEETS—SHEET 2.
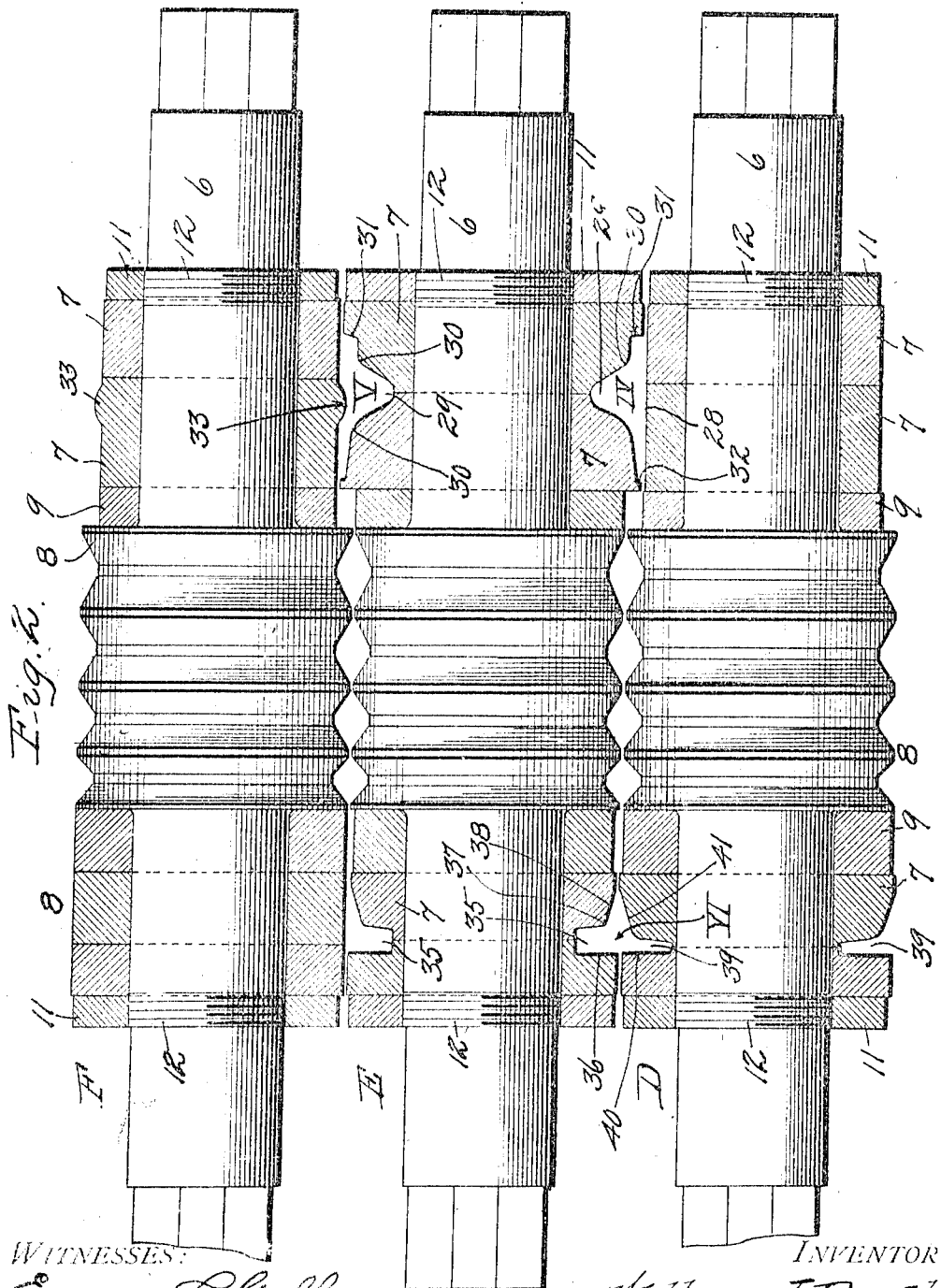
WITNESSES:
Emory L. Goff
R. C. Braddock
INVENTOR
William J. Bradley
BY
D. T. Wolhaupter.
Attorney

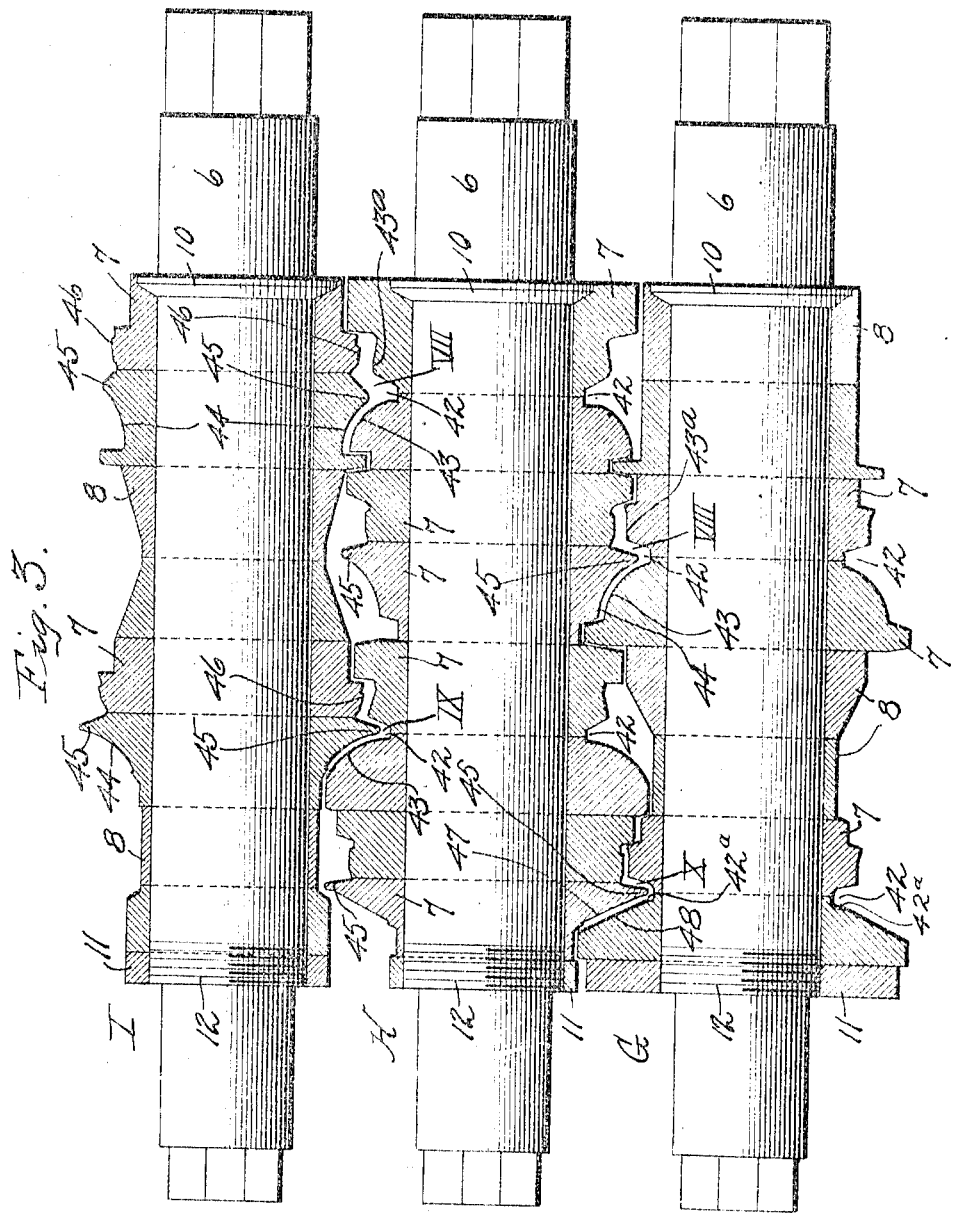

W. J. BRADLEY.
PROCESS OF SHAPING RAIL JOINT BARS.
APPLICATION FILED SEPT. 24, 1908.
1,040,614.
Patented Oct. 8, 1912.
5 SHEETS—SHEET 4.
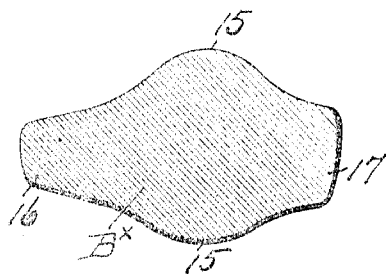
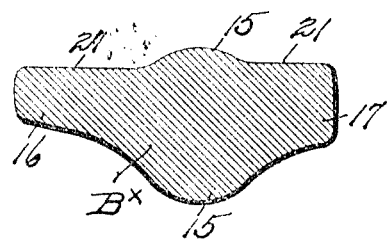
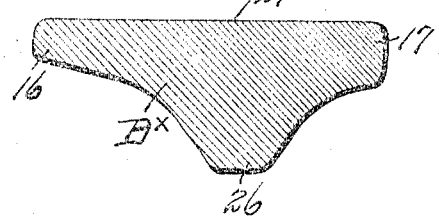
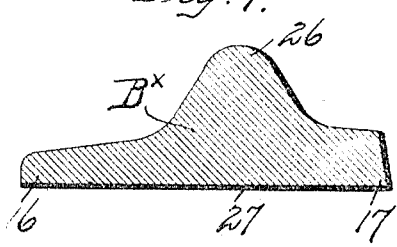
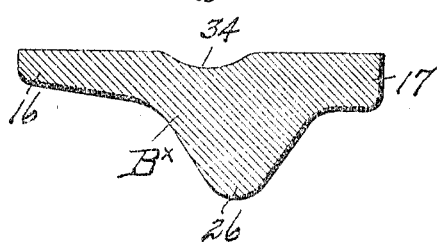
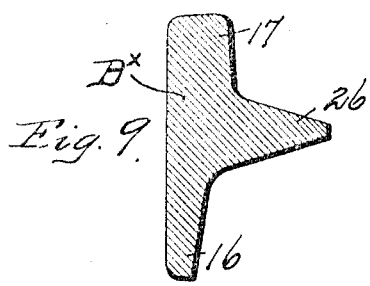
WITNESSES:
Emory L. Groff.
R. C. Braddock.
INVENTOR
William J. Bradley
BY
D. T. Wolhaupter.
Attorney W. J. BRADLEY.
PROCESS OF SHAPING RAIL JOINT BARS.
APPLICATION FILED SEPT. 24, 1908.

1,040,614.

Patented Oct. 8, 1912.
5 SHEETS—SHEET 5.

WITNESSES:
Emory L. Goff.
R. C. Braddock

INVENTOR
William J. Bradley
BY
S. T. Wolhaupter
Attorney

UNITED STATES PATENT OFFICE.

WILLIAM J. BRADLEY, OF TROY, NEW YORK, ASSIGNOR TO THE RAIL JOINT COMPANY, OF NEW YORK, N. Y., A CORPORATION OF NEW YORK.

PROCESS OF SHAPING RAIL-JOINT BARS.

1,040,614.

Specification of Letters Patent.

Patented Oct. 8, 1912.

Application filed September 24, 1908. Serial No. 454,550.

*To all whom it may concern:*

Be it known that I, WILLIAM J. BRADLEY, a citizen of the United States, residing at Troy, in the county of Rensselaer and State of New York, have invented certain new and useful Improvements in Processes of Shaping Rail-Joint Bars, of which the following is a specification.

This invention relates to the subject of metal rolling, and has particularly in view certain novel and practical processes carried out by specially designed passes of a roll train to provide for the formation of rail joint bars of a special design.

To this end the invention contemplates improved and practical means for forming by the roll train of a rolling mill, a rail joint angle bar of the continuous type, but having a base section of a width equaling, or exceeding, the width of the bases of the rails, and which base section therefore is intended to extend throughout the full width of the rails connected by joint bars of this design.

In shaping the passes of a roll train for rolling a bar of the character above indicated, certain difficulties and problems have only been overcome by careful calculation and experiment with the result of developing, by the present invention, a radically different pass formation from the pass formation ordinarily employed in the rolling of rail joint bars. It is only by reason of the peculiar and special features of the new pass formation herein claimed, that the modified continuous angle bar referred to can be properly formed, and it will therefore be noted that the present invention provides a consecutive and complemental series of roll passes of such form, dimension, and relation, as to provide for the progressive distribution and reduction of the metal, and the gradual shaping of the bar, in such a manner as to develop a finished product having the proper thickness, design, and weight, and otherwise having the necessary commercial and traffic requirements for a bar of the character referred to.

With these and other objects in view, which will appear to those skilled in the art as the nature of the invention is better understood, the same consists in the novel construction, combination, and arrangement of parts hereinafter more fully described, illustrated and claimed.

Figure 14:
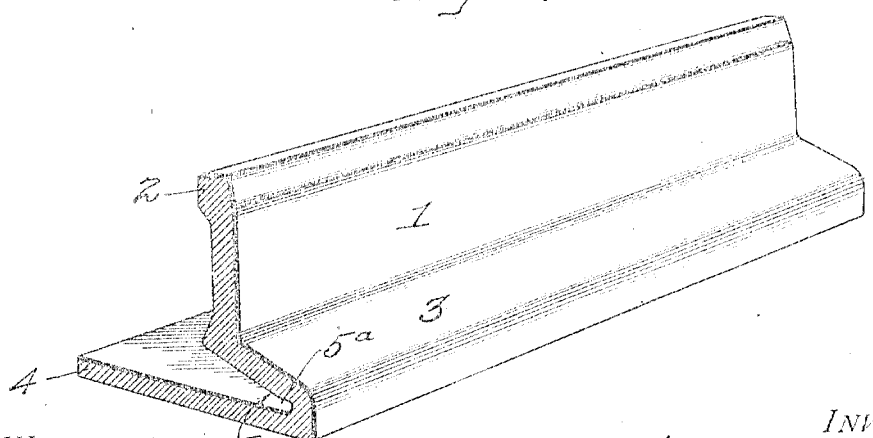

The essential feature of the invention, involved in the improvements embraced in the various passes, is necessarily susceptible to some variations without departing from the scope of the invention as set forth in the appended claims, but a preferred and practical embodiment thereof is shown in the accompanying drawings, in which:

Figure 1 is a sectional elevation of those rolls of the complete train which are termed herein the primary reducing rolls, and are commonly known as the bull rolls. Fig. 2 is a similar view of those rolls of the train termed herein the secondary development rolls, and commonly known as the combination rolls. Fig. 3 is a similar view of the finishing rolls of the train. Figs. 4 to 13 inclusive are cross sectional views illustrative of the progressive development of the bar as shaped by the various passes. Fig. 14 is a sectional perspective view of the special design of continuous angle bars, which is the product made by the present invention.

Like reference characters designate corresponding parts in the several figures of the drawings.

Inasmuch as the improvements claimed herein, with respect to the peculiar form of the roll passes to provide for the proper progressive distribution and reduction of the metal, and the simultaneous shaping of the rail joint bar, are of special importance and utility in the manufacture of a modified design of continuous rail joint angle bar, the latter is shown for illustrative purposes in Fig. 14 of the drawings. Referring thereto, it will be observed that this design of angle bar is substantially like the conventional and well known form of continuous bar with the exception that the base section of the modified design shown in Fig. 14 is of such a width as to extend throughout the full width of the rails from edge to edge of the base flanges thereof. Referring specifically to said modified design of continuous joint bar, it may be observed that the same embodies therein an upright splice member 1 formed at its upper edge with a thickened bearing head 2 adapted to bear against the under side of the rail head. At the lower edge of the upright member or girder 1 the bar body is formed with an outwardly extending foot flange 3 adapted to overlie the base flange of the rail, and having integrated with the outer edge portion thereof the integral horizontal rail supporting base section 4, which base section may be characterized as a full width base section, inasmuch as the same extends beneath the bases of the rails the full width thereof. Between the base section 4 and the outwardly extending foot flange 3 there is provided a continuous flange receiving pocket or space 5 for the reception of the base flanges of the rail, and for the purposes of description herein, the said pocket or space 5 in the incomplete rollings, will be referred to as the entrant groove. It will be apparent that this construction, which is produced by the roll passes, provides for the width of the metal of one side of said entrant groove being two or more times the width of the metal on the opposite side of the said groove. Also, the said groove forms the upper and lower bearings of the rail flange, the bearing in the said groove for the bottom of the base flange being two or more times the bearing of the top of the base flange.

In carrying the invention into effect, it will be understood that the several groups of rolls may be mounted or arranged in any approved manner, according to good rolling mill practice, and even the entire series of passes may be carried by one set of rolls without affecting the purpose of the present invention, but in the practical embodiment of the latter the roll train, which is utilized in making the joint bar shown in Fig. 14 of the drawings, comprises the three sets of related and complemental rolls referred to, viz: the primary reducing rolls, the secondary developing rolls, and the finishing rolls. From a structural standpoint, and also in the matter of the means provided for the assembling and taking apart of the elements of the rolls, all of the same are alike. In this connection, it is to be noted that each of the rolls of each set essentially comprises a mandrel or shaft 6 on which are detachably sleeved in side by side relation, a plurality of die rings or collars 7, the die faces of which form the walls of the roll passes hereinafter referred to. Also, each roll mandrel 6 accommodates thereon, in connection with the die rings or collars 7 upon which are the working portions, the detachable filler and spacing collars 8 and 9 respectively, which are utilized for filling the blank portions of the rolls and also for properly spacing apart the several ring or collar elements, and permitting the same to be tightly clamped in position between a suitable abutment or abutment shoulder 10 on the mandrel, and a locking nut 11 in the form of a ring detachably engaging a threaded section 12 of the mandrel. By reason of this construction, it will be noted that the various ring or collar elements forming the working parts of the individual rolls may be readily removed and replaced, and arranged in any desired relative positions, as occasion may require.

The primary reducing rolls are arranged in a set of three, in superposed relation, one above the other, and are designated respectively by the reference letters A, B and C, and between the opposing die rings 7 of the rolls A and B, there is formed the initial pass I of the series. This initial pass I receives the bar which may or may not have been reduced to a suitable size capable of readily passing through said pass I, but for the purposes of the present invention, it will be understood that the bar as received by the said pass receives in the latter the first shape or form which bears a definite relation to the completed product which is to be rolled therefrom. Hence, the said initial pass I effects an initiatory distribution of metal in the bar, and gives the cross section of Fig. 4 of the drawings.

Referring more particularly to the formation of the initial pass, it will be observed that the opposing pass walls respectively in the rolls A and B are similarly shaped, each of said pass walls having therein what may be termed an intermediate rounded shaping groove 13, and convexed reducing faces 14 at each side of said groove and merging into the same. Said reducing faces terminate, at what may be termed their outer ends, in retaining shoulders 15$^a$ for checking the flow of the metal in the direction of the interval between the non-working faces of the opposing rolls. It has been usually found necessary, in the calculations with respect to the proper distribution of the metal, to have the shaping groove 13 in the upper roll member B of slightly greater depth than the corresponding shaping groove in the lower roll member A, and the resultant bar section shaped by the said pass I of the outline described, is of the form shown in Fig. 4. This initial shape of the bar may be characterized as the starting form, and in cross section may be described as a bar body B$^x$ having an intermediate thick waist portion presenting projecting rounded swells 15 upon both sides thereof, which swells correspond in the shape and extent of projection to the opposite shaping grooves 13 of the pass I. In addition to the thick waist portion the bar body shown in Fig. 4 is provided upon opposite sides of the waist with the lateral flange portions 16 and 17 respectively, the flange portion 16 being reduced thinner than the flange portion 17. The bar section from pass I is next introduced into pass II which is formed between opposing dies of the intermediate roll B and the top roll C of said primary reducing rolls, and in this connection, it will be observed that the upper die of pass I constitutes the lower die for pass II. The said pass II is of approximately the same configuration as pass I, and differs therefrom principally in its width, as the opposing walls of the said pass II are provided with the intermediate shaping grooves 13—18, the convexed reducing faces 19—19 at the sides of said grooves, and the retaining shoulders 20 at the outer ends of the faces 19. It will be observed that the lower groove 13 of pass II is materially greater than the upper groove 18 of the upper pass wall. Consequently, the bar section which is rolled through the pass II between the dies forming such pass, receives a distinct reduction in cross sectional area though preserving the same general formation as the bar section shown in Fig. 4. The bar section shaped by pass II is shown in Fig. 5, but by reason of the shallowness of the upper shaping groove 18 of the pass II, and the fact that the upper reducing faces 19 of said pass are approximately flat, the bar section of Fig. 5 is only left with a slight swell projection 15 at one side, while the said side having said projection is formed with approximately flat faces 21 at one side of the lateral flange portions 16 and 19, the latter also being reduced in thickness. The slight swell projection 15 from the flat side 21—21 of the bar section shown in Fig. 5, acts in the capacity of a pressure rib for forcing the metal down into the shape of pass III, which pass is confined between opposing dies of the bottom and intermediate rolls A and B of the primary set shown in Fig. 1. The upper pass wall 22 of pass III is substantially flat throughout, and the action thereof serves to reduce the slight swell or projection 15 at one side of the bar shown in Fig. 5, while at the same time the large swell or projection 15 at the opposite of the same bar is forced downward into an approximately U-shaped shaping groove 23 provided in the lower pass wall of the pass III. The sides of the groove 23 merge into the convexed reducing surfaces 24 terminating at their outer edges in the retaining shoulders 25 having the function of the shoulders 15 and 20 herein referred to. The bar as shaped by the pass III has the formation shown in Fig. 6, said form involving a further reduction of the flange portions 16 and 17 and a more angular waist projection designated in Fig. 6 by the reference number 26. This waist projection is arranged at the side of the bar opposite the flattened side or face 27 formed by the upper pass wall 22. The primary reducing or butt rolls practically complete their functions in the production of the bar section shown in Fig. 6, and this bar section is now taken up for treatment by the secondary development rolls designated respectively by the letters D, E, and F, and arranged in the same relative positions as the rolls A, B, and C before referred to. Pass IV is the initial pass of the secondary development rolls, and is formed between opposing dies of the lower and intermediate rolls D and E. This pass differs from pass III principally in the particular of giving more definite shape, and further reduction to the bar section in Fig. 6. Specifically, the pass IV is formed between a lower straight pass wall 28 and an upper pass wall having an approximately U-shaped shaping groove 29 having a more rounded bottom than the corresponding groove 23 of pass III, and merging into more abruptly convexed side reducing faces 30 terminating at their outer edges in retaining shoulders 31 and 32 respectively, the retaining shoulder 31 serving to give more definite shape to the lateral flange extension 17 of the bar body, while a corresponding function is subserved by the shoulder 32 with respect to the flange portion 16. Pass IV produces the shape shown in Fig. 7.

The reduced bar section of Fig. 7 is received within pass V formed between the same die that forms the upper pass wall of pass IV, and a die of the upper roll F. Hence, pass V differs from pass IV in the particular that the upper pass wall is provided, slightly at one side of the vertical center of the groove 29, with a rounded tonguing projection 33 which forms, in the flat side 27 of the bar body, a compensating depression 34 which prevents an overflow of metal between two rolls in the edging pass VI. See bar section of Fig. 8. The edging pass VI marks a radical and important step in the progressive development of the bar section, as the pass walls of pass VI operate on the bar edgewise, the bar being entered through the pass vertically. It will be observed that the upper wall of the pass VI is formed with an approximately rectangular deep shaping groove 35, one side of which groove has a vertical flat face 36, the opposite side of which groove is of an obtuse angled form, as indicated at 37 to present an inclined flat reducing face 38. The lower wall of the pass VI is correspondingly provided with an approximately rectangular deep shaping groove 39 having at one side a vertical flat face 40, and whose other side is of an obtuse angled formation to present an inclined flat reducing face 41 corresponding to the face 38. The groove 35 is wider, though shallower, than the groove 39 so that the said grooves respectively receive and further reduce the flange portions 16 and 17 of the bar body, while the opposing inclined wall faces 38 and 41 give a further reduction to, and make a well defined V-shape for, the waist projection 26 at one side of the bar body. This cross section of bar body is shown in Fig. 9 of the drawings, and it will be observed that the compensating depression 34 is worked out of the flat side 27, and in so doing, prevents an overflow of metal between the opposing rolls, D and E.

It will be observed that the edging pass VI completes the shape of the waist projection 26. This waist projection, in the formation shown in Fig. 9, corresponds substantially to the external form of the foot portion 3 of the completed bar shown in Fig. 14, said foot portion including the adjoining part of the base section 4 which is integral therewith. Inasmuch as the said foot portion, embodied in the waist projection 26 of the bar section shown in Fig. 9, is completed after leaving pass VI, no further work is done on this part of the bar, but a further development, and reduction of the latter for shaping purposes is carried out in passes VII, VIII and IX, which are formed between the finishing rolls.

The rolls of the finishing set are designated respectively G, H, and I, and pass VII is formed between the opposing dies of the intermediate and top rolls H and I. The walls of the pass VII operate particularly on the flange portions 16 and 17 of the bar body, and the thicker flange portion 17 receives in the pass VII the initiation of the shape for the upright member 1 and the head 2 of the finished product. To this end the lower wall of the pass VII is formed with an approximately V-shaped seating groove 42 for the waist projection 26 constituting the foot projection or portion of the angle bar above specified. Also, the lower wall of the pass VII is formed at one side of the groove 42 with an angle shaping face 43ª for shaping the outside angle of the upright member and head of the bar section, and at the opposite side of the groove 42, the said lower pass wall is formed with a continuous convexed spreading face 43 arranged in parallelism to, and coöperating with, a complemental concaved spreading face 44 formed in the upper pass wall. In addition to the face 44 the upper pass wall is formed with a tonguing projection 45 lying opposite the groove 42 in the lower pass wall, and at one side of which tonguing projection the upper pass wall presents a shaping face 46 for the inside face of the upright member and head 1 and 2 of the angle bar to be formed.

It is to be particularly noted that pass VII not only initiates the shape of the upright member and head 1 and 2 of the bar in the thicker flange portion 17 of the bar section shown in Fig. 9, but also spreads out, through the reducing action of the faces 43 and 44, the thinner flange portion 16 into a much widened and thinner flange which is spread out to one side of the waist or foot projection 26 on an easy, long curve. Also, the tonguing projection or rib 45 of the pass VII initiates the entrant groove 5 of the bar in one side thereof. These details in the bar formation which result from the action of the pass VII are plainly shown in Fig. 10 of the drawings.

Figure 11:
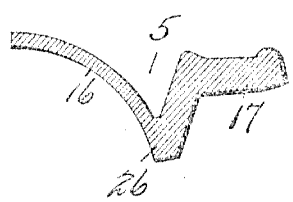
Figure 12:
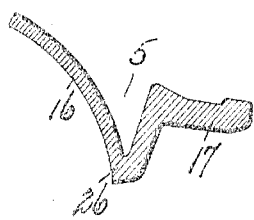
Figure 13:
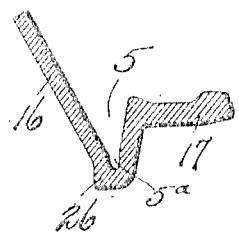

Pass VIII is formed between opposing dies of the rolls G and H, and pass IX between opposing dies of the rolls H and I. These two passes, however, are similar in design to pass VII, and hence, similar reference letters will apply to corresponding parts in these several passes, the same only differing particularly with respect to the dimension or size of the elements in order to get a progressive reduction of the metal in passes VIII and IX. Also, the said similar passes differ noticeably in the graduated projection of the tonguing part 45, so that the entrant groove 5 may be tongued out to its full depth, as shown in the bar section of Fig. 12, which bar section is the result of the action of pass IX. Fig. 11 shows the bar section reduced by pass VIII.

Pass X is the final pass and is constructed similarly to the several passes immediately preceding it, with the exception that instead of the spreading faces of the passes VII, VIII and IX, the corresponding portions 47 and 48 of the opposing pass walls are arranged in straight lines, though obliquely to a vertical plane. Hence, the faces 47 and 48 of the pass walls of pass IX act as straightening faces for straightening out the widened flange 16, which makes the base section 4 in the completed bar. The bar section shown in Fig. 13 results from the action of pass X and leaves the base forming flange set obliquely or at an angle to the girder part which underlies the head of the rail, but this part of the bar section is straightened out by the ordinary bulldozing or other forming machine. In further explanation of the pass X it will be observed that the tongue or projection 45 for this pass is provided with a narrowed tip that coöperates with a shoulder 42ª of the groove 42 of said pass to produce, as one of the final steps of the process, the clearance groove extension 5ª at the bottom of the flange receiving pocket or space 5 of the rail joint bar. This is a feature of practical importance in the production of a modern rail joint bar which includes a clearance beyond the edge of the base flange of the rail.

From the foregoing, it will be observed that the various passes provide for an easy and accurate rolling operation, while at the same time securing such a progressive distribution and reduction of the metal and a gradual shaping of the bar as to insure the finished product having the proper design, thickness, and weight throughout, and also the construction and arrangement of parts described permit of rolling out in a practical manner a continuous type of rail joint angle bar having a double width base section, that is a base section extending beneath the bases of the rails the full width thereof, as hereinbefore pointed out.

I claim:

1. The process of shaping rail joint bars consisting in passing a bar blank through a roll pass to produce laterally projecting portions and an enlarged waist portion projecting at both sides, and then subjecting it to a series of passes which force the metal of the waist portion to one side, forming a substantially flat face on one side having a compensating depression therein and an enlarged portion on the other side.

2. The process of shaping rail joint bars consisting in passing a bar blank through a roll pass to produce laterally projecting portions, and an enlarged waist portion projecting at both sides, then subjecting it to a series of passes which force the metal of the waist portion to one side forming a substantially flat face on one side with a depression therein and an enlarged portion on the other side and then subjecting it to a pass which eliminates said depression and simultaneously narrows the said enlarged portion at one side of the blank.

3. The process of shaping rail joint bars consisting in passing a bar blank through a roll pass to produce laterally projecting portions, and an enlarged waist portion projecting at both sides, and then subjecting it to a series of passes which force the metal of the waist portion to one side, and to other passes which develop an entrant groove in the side opposite the enlargement at said waist portion.

4. The process of shaping rail joint bars consisting in passing a bar blank through a roll pass to produce laterally projecting portions and an enlarged waist portion projecting at both sides, then subjecting it to a series of passes which force the metal of the waist portion to one side, forming an enlarged portion thereat, and then subjecting it to other passes which develop an entrant groove in the side opposite the enlargement at the waist portion, and form a flat thinned section spread from one of said laterally projecting portions.

5. The process of shaping rail joint bars consisting in passing a bar blank through a roll pass to produce laterally projecting portions, and a waist portion projecting at both sides, then subjecting it to a series of passes which force the metal of the waist portion to one side, and then subjecting it to other passes which develop an entrant groove in the side opposite the projection at the waist portion and to form a flat thinned section spread from one of the laterally projecting portions, and a thicker member shaped from the other of said laterally projecting portions.

6. The process of shaping rail joint bars consisting in passing a bar blank through a roll pass to produce laterally projecting portions, and a waist portion projecting at both sides, then subjecting it to a series of passes which force the metal of the waist portion to one side, and then subjecting it to other passes which develop an entrant groove into the side opposite the enlargement at the waist portion, which produce a groove-extension at the bottom of said entrant groove, and form a flat thinned section spread from one of the laterally projecting portions, and a thicker splice member shaped from the other of the laterally projecting portions.

In testimony whereof I hereunto affix my signature in the presence of two witnesses.

WILLIAM J. BRADLEY.

Witnesses:
BENJ. WOLHAUPTER,
WALTER S. OGILVY.